J. R. VAN TASSEL.
LENS MOUNTING FOR EYEGLASSES.
APPLICATION FILED MAR. 18, 1918.
1,299,068.
Patented Apr. 1, 1919.
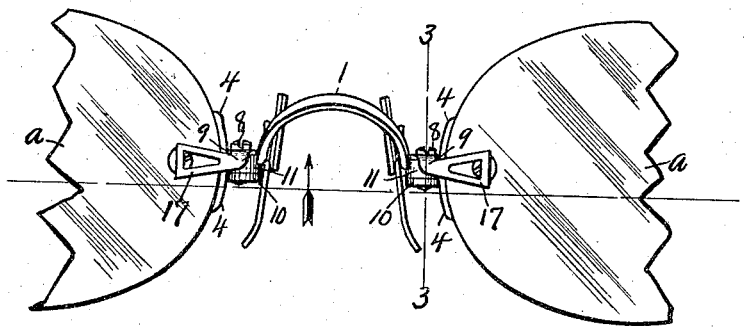
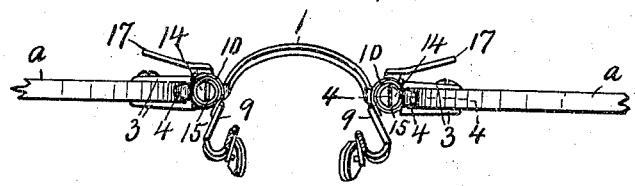
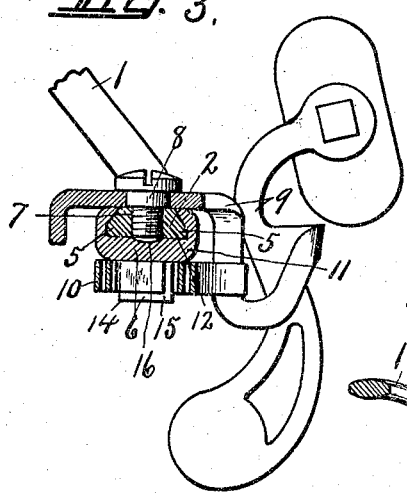
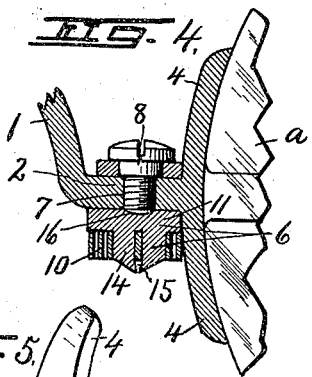
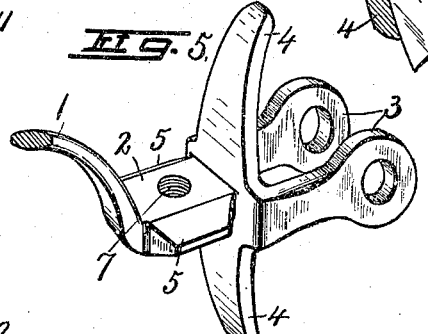
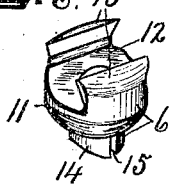
INVENTOR
J. R. Van Tassel
BY
Howard P. Denison
ATTORNEY.

UNITED STATES PATENT OFFICE.

JOHN R. VAN TASSEL, OF GENEVA, NEW YORK, ASSIGNOR TO THE STANDARD OPTICAL COMPANY, OF GENEVA, NEW YORK, A CORPORATION OF NEW YORK.

LENS-MOUNTING FOR EYEGLASSES.

1,299,068.                Specification of Letters Patent.      Patented Apr. 1, 1919.

Application filed March 18, 1918. Serial No. 223,078.

*To all whom it may concern:*

Be it known that I, JOHN R. VAN TASSEL, a citizen of the United States of America, and resident of Geneva, in the county of Ontario, in the State of New York, have invented new and useful Improvements in Lens-Mountings for Eyeglasses, of which the following, taken in connection with the accompanying drawings, is a full, clear, and exact description.

This invention relates to certain improvements in lens-mountings for eyeglasses, and refers more particularly to the means for supporting the operating springs for the nose-grips commonly used in eyeglass mountings.

One of the objects is to bring the assembled parts, including the connecting frame for the lenses, the nose-grips and spring supports, into more compact relation than has heretofore been practised so as to avoid excessive projections of any of the parts, and at the same time to increase the strength, general working efficiency and symmetry of those parts.

Another object is to enable the springs to be easily and quickly mounted upon separate supports as a unitary article of manufacture and to construct said supports and portions of the bridge-piece in such manner that they may be expeditiously assembled by sliding interlocking engagement independently of the nose-grips.

Another object of this sliding interlocking engagement between the spring supports and bridge-piece is to afford relatively broad bearings for said supports and nose-grips, whereby they will be held more firmly in operative relation.

A further object is to utilize the pivotal screws for the nose-grips as set screws for retaining the spring supports in operative position, and also to permit said supports to be readily removed by simply loosening the set screws without disturbing the operative positions of the nose-grips.

Other objects and uses relating to specific parts of the mounting will be brought out in the following description.

In the drawings—

Figure 1 is an enlarged face view of a lens-mounting and adjacent portions of the lenses, showing my improvements.

Fig. 2 is an inverted plan of the parts shown in Fig. 1.

Fig. 3 is a still further enlarged transverse vertical sectional view taken on line 3—3, Fig. 1.

Fig. 4 is an enlarged vertical sectional view taken on line 4—4, Fig. 2.

Fig. 5 is a perspective view of one end of the bridge-piece enlarged, showing more particularly the dove-tailed portion thereof for receiving one of the spring supports.

Fig. 6 is a perspective view of one of the spring supports.

As illustrated, this mounting comprises a bridge-piece —1— having its ends provided with substantialy flat horizontal bearings —2—, to which are secured separate pairs of lens-clamping ears —3— and rim-engaging braces or arms —4—, as shown more clearly in Fig. 5.

The opposite longitudinal edges of the bearings —2— are preferably dove-tailed in cross section to form guideways —5— for receiving a pair of spring supports —6—, the upper and lower faces of said bearings being substantially flat and parallel, as shown more clearly in Fig. 3.

The central portions of the bearings —2— are provided with vertical threaded apertures —7— for receiving pivotal screws —8— by which the nose-grips or guards, as —9—, are retained upon the upper faces of the bearings —2— for horizontal swinging movement.

The supports —6— are adapted to carry suitable coil springs for operating the nose-grips —9— toward each other to grip the opposite sides of the nose of the user, each spring support consisting of a cylindrical block —11— having a dove-tailed groove —12— in its upper face forming opposite wings —13— for sliding interlocking engagement with the dove-tailed ribs —5— of the corresponding bearing —2—.

The lower end of each spring support is reduced in diameter forming a cylindrical post —14— which is provided with a transverse slot —15— opening from its lower end for receiving one end of the corresponding spring —10— and holding it in a substantially horizontal position so that its free end may engage a portion of the nose-grips —9—, as shown more clearly in Figs. 2 and 3.

The lower extremities of opposite walls of the slot —15— are preferably beveled as shown in Fig. 4 to enable them to be more easily crimped or drawn in toward each other across the adjacent edge of the spring by a suitable swaging tool for firmly holding the latter in operative position around the post, and at the same time permitting the removal of the spring, if necessary, by simply inserting a suitable expanding or prying tool in the opening of the slot for prying the previously contracted walls apart.

The spring shown is of the flat type, but it is evident that any other form of spring may be used without departing from the spirit of this invention.

The diameter of the block —11— of each spring support is substantially equal to, but slightly less than the length of its corresponding bearing —2— so that when assembled upon said bearing it may abut against the adjacent rim-engaging arm —4— to aid in holding said arm against th rim of the lens, the lower wall of the groove —12— being formed with a recess —16— which is alined with the threaded aperture —7— when the spring support is assembled on the bearing —2— for receiving the lower end of the screw —8— to hold the spring support in its adjusted position against lengthwise displacement from the bearing —2—, as shown more clearly in Figs. 3 and 4.

By loosening the screws —8— sufficiently to withdraw it from the recesses —16—, the spring supports —6— with the spring —10— thereon may be easily withdrawn inwardly from their respective guides —2— or reversely replaced thereon without displacing either nose-grip.

Each nose-grip is provided with a finger piece —17— normally lying across a portion of the front face of the lens when it may be easily engaged to open the nose-grips against the action of their respective springs when removing or replacing the eye-glasses from or upon the nose.

What I claim is:

1. In a lens-mounting for eyeglasses, the combination with a bridge, of a nose-guard, pivoted thereto, and a block slidable lengthwise of and upon the bridge and provided with a retracting spring for the nose-guard.

2. A lens-mounting for eyeglasses comprising a bridge-piece, nose-grips pivoted to the bridge-piece, springs for operating the nose-grips, and supports for the springs slidably interlocked with the bridge-piece independently of the nose-grips and pivots.

3. A lens-mounting for eyeglasses comprising a bridge-piece, nose-grips pivoted to the bridge-piece, springs for operating the nose-grips, and supports for the springs slidably interlocked with the bridge-piece independently of the nose-grips and pivots, said pivots being adjustable to lock and release the support.

4. A lens-mounting for eyeglasses comprising a bridge-piece, nose-grips pivoted to the bridge-piece, springs for operating the nose-grips, and supports for the springs slidably interlocked with the bridge-piece independently of the nose-grips and their pivots, said supports being slotted to receive the adjacent ends of the springs.

5. A lens-mounting for eyeglasses comprising a bridge-piece, nose-grips pivoted to the bridge-piece, springs for operating the nose-grips, and supports for the springs slidably interlocked with the bridge-piece independently of the nose-grips and their pivots, said supports being slotted to receive the adjacent ends of the springs, portions of the walls of said slots being compressed toward each other to hold the springs on their supports.

6. The combination with a connecting bridge for eyeglasses, of nose-grips pivoted to the upper sides of the ends of the bridge, spring-supports slidably engaging the undersides and edges of said bridge, and springs on said supports for operating the nose-grips.

7. In a lens-mounting for eyeglasses the combination with a bridge, of a nose-guard, a pivotal screw passed through the nose-guard and bridge, a block slidable along the bridge to and from a position across one end of said screw, and a retracting spring for the nose-guard mounted on said block, said screw being movable into and out of engagement with the block for clamping and releasing the same.

8. In a lens-mounting for eyeglasses, the combination of a bridge piece, nose-grips and operating springs therefor, and supports for said springs, the bridge-piece and spring-supports having dove-tailed connection one with the other for sliding interlocking engagement.

9. In a lens-mounting for eyeglasses, the combination of a bridge-piece, nose-grips on the bridge-piece, pivotal screws for the nose-grips, springs for operating the nose-grips, and supports for the springs slidably interlocked with the bridge-piece and provided with recesses for receiving the ends of said screws to hold the spring supports against sliding movement.

In witness whereof I have hereunto set my hand this sixth day of March, 1918.

JOHN R. VAN TASSEL.

Witnesses:
L. B. COLEMAN,
M. I. GOETCHIUS.